(No Model.)

R. PUNSHON & R. R. VIZER.
BLASTING CARTRIDGE.

No. 297,951. Patented Apr. 29, 1884.

Witnesses.
Chas. J. Hyer.
Robert Everett.

Inventors.
Robert Punshon
Robert R. Vizer.
By James L. Norris.
Atty.

UNITED STATES PATENT OFFICE.

ROBERT PUNSHON AND ROBERT R. VIZER, OF LONDON, ENGLAND.

BLASTING-CARTRIDGE.

SPECIFICATION forming part of Letters Patent No. 297,951, dated April 29, 1884.

Application filed December 8, 1883. (No model.) Patented in England May 12, 1883, No. 2,428.

*To all whom it may concern:*

Be it known that we, ROBERT PUNSHON and ROBERT ROBINSON VIZER, both of London, England, have invented an Improved Cartridge for Blasting and other Purposes, (for which we have obtained a patent in Great Britain, No. 2,428, bearing date May 12, 1883,) of which the following is a specification.

Our invention relates to the utilization of a compound of picric acid and nitric acid (the latter of the specific gravity of 1.5) for blasting or similar purposes. It is known to chemists that nitric acid and picric acid, when combined in certain proportions, form an explosive compound as powerful as nitro-glycerine; but the use of this compound has not hitherto been found practicable.

The object of our invention is to enable these two acids to be utilized for blasting or similar purposes. This we accomplish by taking a vessel of glass, or other acid-proof and friable substance, containing nitric acid, and hermetically sealed by means of glass or other acid-proof material, and introducing the said vessel into a case or receptacle, in which the said vessel is surrounded or covered with picric acid. We usually make the apparatus in the form of a blasting-cartridge. At or in the place where the cartridge is to be exploded the two acids are caused to combine by breaking the said vessel containing the nitric acid, which may be effected by thrusting a pricker or pointed rod longitudinally, vertically, or otherwise into the cartridge, or by other suitable means. The vessel for containing the nitric acid we make of peculiar form—that is to say, we make the same with an aperture at one end, and with a conical passage or tube to receive a small ball of glass or other acid-proof material, for closing the said aperture. The said tube can be filled with cement or similar substance after the aperture is thus closed, for the purpose hereinafter specified.

In the accompanying drawings we have shown various forms of our improved cartridge.

Figure 4:
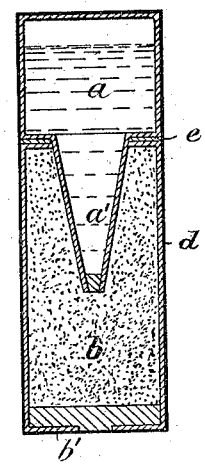
Figure 5:
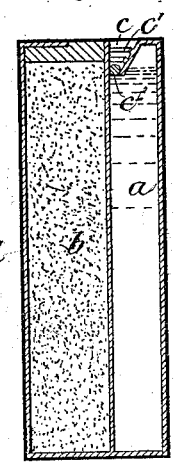
Figure 6:
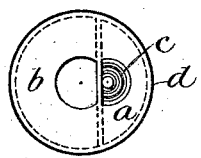
Figure 7:
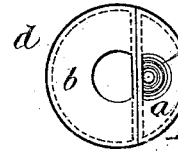

Figures 1 to 5 are central longitudinal sections, and Figs. 6 and 7 are plans.

$a$ represents the vessel for the nitric acid, and $b$ the vessel for the picric acid. $c$ is a conical passage or tube for filling the vessel $a$. This passage is made with ribs or projections $c'$, and is provided with a ball, $c^2$, of glass or other suitable material. When the vessel has been filled with nitric acid, the said ball is placed upon the mouth of the said vessel, and the said passage is filled with any suitable cement, the said ball preventing the entrance of the cement into the vessel, and the ribs or projections $c'$ preventing the withdrawal of the cement from the said passage. The edges of the vessel $b$ are turned inward at $b'$ to form an internal shoulder, which will prevent the withdrawal of the cement which is inserted in the aperture when the vessel has been filled with picric acid. The two vessels are inserted in an outer case, $d$, of paper or other suitable material.

Figure 1:
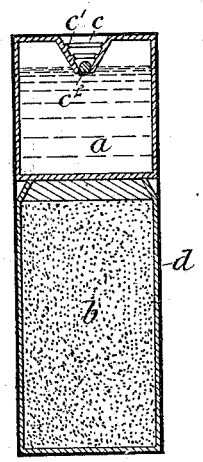

In Fig. 1 the vessel $b$ is inserted in the case $d$, and the vessel $a$ is introduced into the said case above the vessel $b$.

Figure 2:
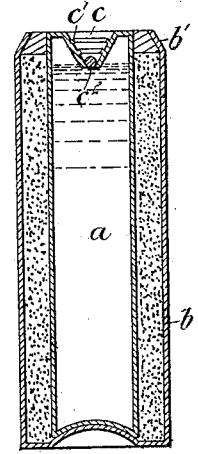

In Fig. 2 the vessel $a$ is inclosed in the vessel $b$.

Figure 3:
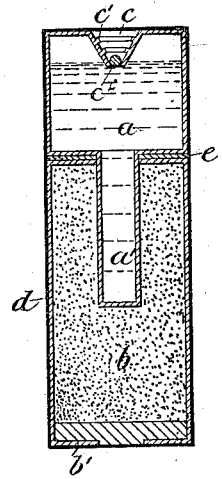

In Fig. 3 the vessel $a$ is made with an extension, $a'$, which projects into the vessel $b$, and a piece, $e$, of any suitable packing, is placed between the said vessels.

In Fig. 4 the extension $a'$ is made conical, and in Figs. 5 and 6 we have shown a vessel made with two chambers or compartments, $a$ $b$, of the requisite capacity. A similar cartridge to that shown in Figs. 5 and 6 may be made by employing two vessels $a$ and $b$, as shown in plan in Fig. 7.

The ingredients should be employed in about the following proportions, viz: from one and a half to two parts, by weight, of picric acid to one part, by weight, of nitric acid. In some cases we employ, in combination with the picric acid, nitrate of potash, nitrate of soda, nitrate of baryta, carbon, or other similar or suitable substance, in order to vary or reduce the explosive power of the above-described compound.

It is to be understood that we do not limit ourselves to the form of the cartridges, vessels, or containers, nor to the relative positions which the picric acid and the nitric acid occupy, provided they be in the necessary juxtaposition or capable of being placed in the necessary juxtaposition, substantially as described.

What we claim is—

1. A cartridge for blasting or similar purposes, consisting of a vessel of glass or other acid-proof and friable substance containing nitric acid, and closed by a glass or other acid-proof ball covered with cement or similar material, which vessel is arranged in combination with a vessel or receptacle containing picric acid, substantially as set forth.

2. In a cartridge containing substances which, when mixed, form an explosive compound, a glass or other vessel having an aperture and a conical passage or tube at one end, in combination with a glass or other acid-proof ball for closing the said aperture, substantially as set forth.

3. The combination of the vessel $a$, having the aperture or passage $c$, provided with the ribs or projections $c'$, with the ball $c^2$, substantially as and for the purpose set forth.

4. In a cartridge, a vessel containing nitric acid arranged in combination with a vessel or receptacle containing picric acid mixed with nitrate of potash, nitrate of soda, nitrate of baryta, carbon, or similar substances, in order to vary or reduce the explosive power of the compound, substantially as set forth.

In testimony whereof we have hereunto signed our names in the presence of two subscribing witnesses.

ROBERT PUNSHON.
ROBT. R. VIZER.

Witnesses:
DAVID YOUNG,
JOHN E. BOUSFIELD.